May 21, 1968     D. RUFF     3,384,033
SEMI-AUTOMATIC LOCOMOTIVE CONTROL SYSTEM
Filed May 25, 1967     7 Sheets-Sheet 2
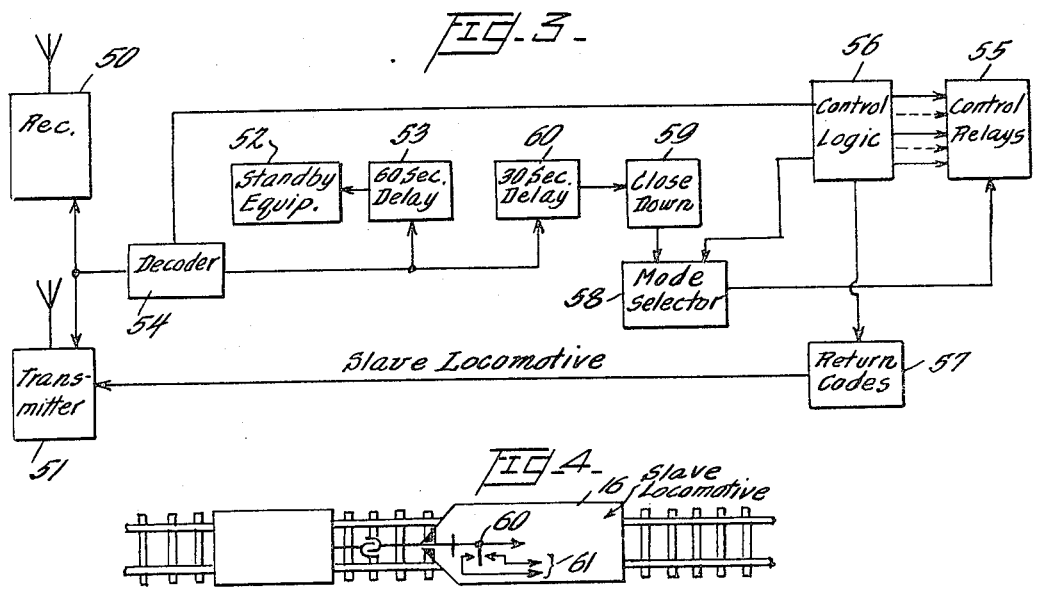
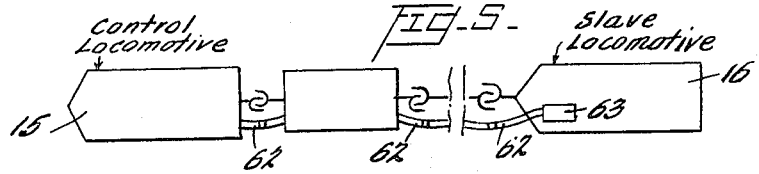
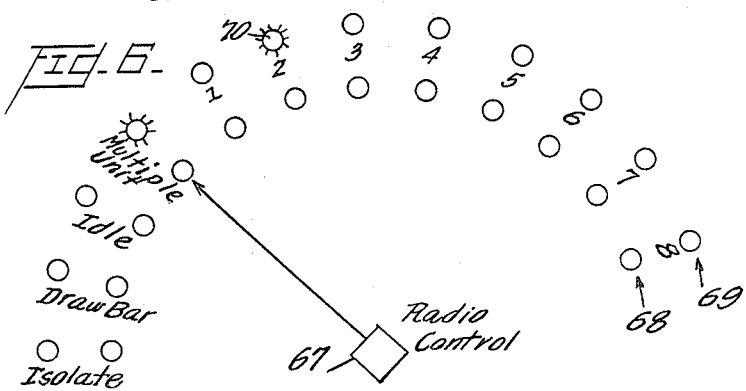
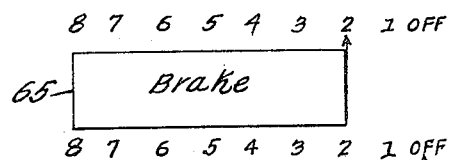
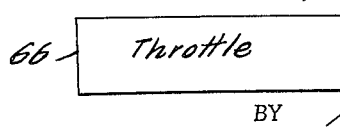
Douglass Ruff
INVENTOR
BY Watson, Cole, Grindle & Watson
ATTORNEY May 21, 1968　　　　　　　　D. RUFF　　　　　　　3,384,033
SEMI-AUTOMATIC LOCOMOTIVE CONTROL SYSTEM
Filed May 25, 1967　　　　　　　　　　　　　　　7 Sheets-Sheet 3
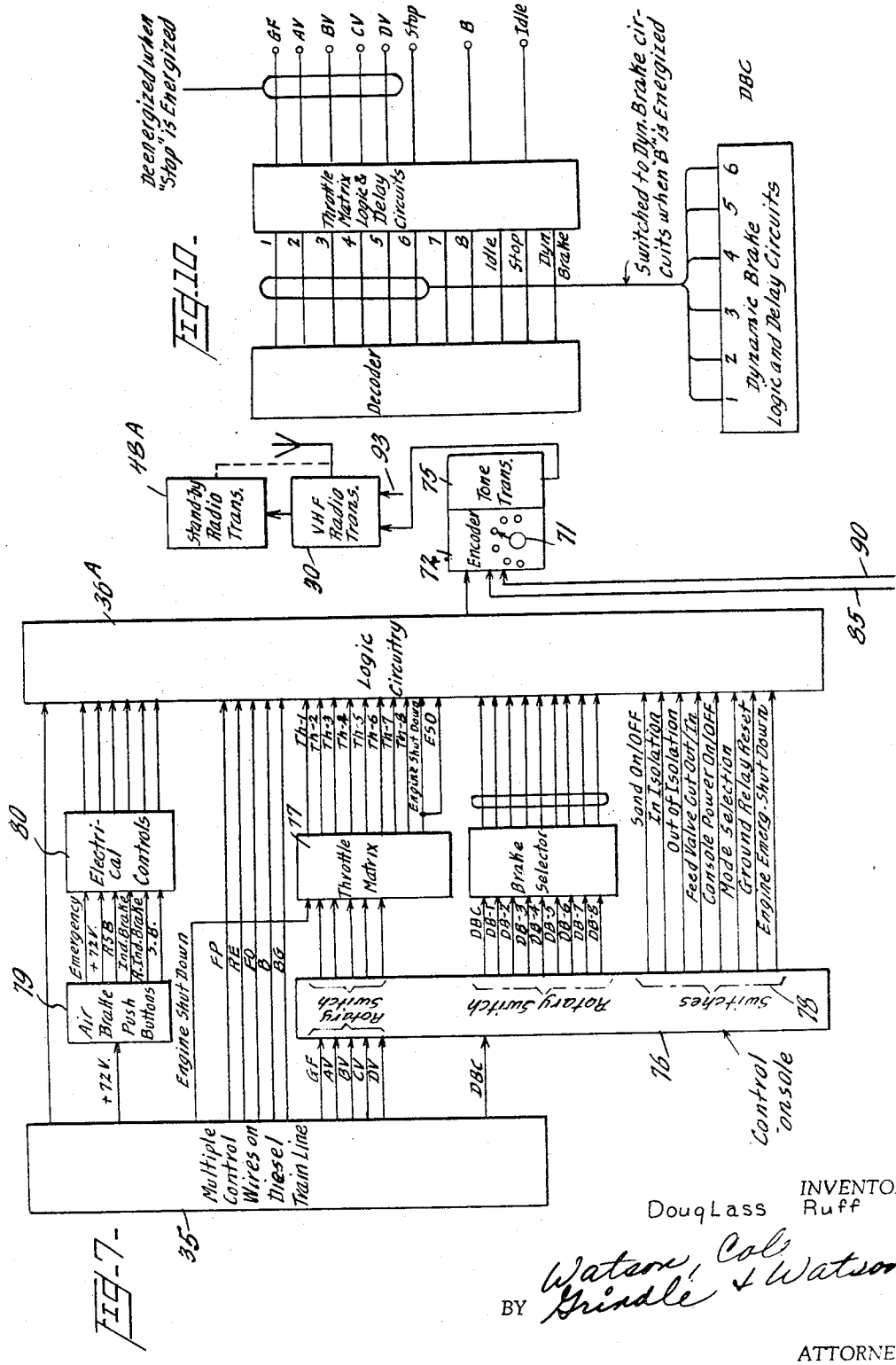
INVENTOR
Douglass Ruff May 21, 1968 D. RUFF 3,384,033
SEMI-AUTOMATIC LOCOMOTIVE CONTROL SYSTEM
Filed May 25, 1967 7 Sheets-Sheet 4
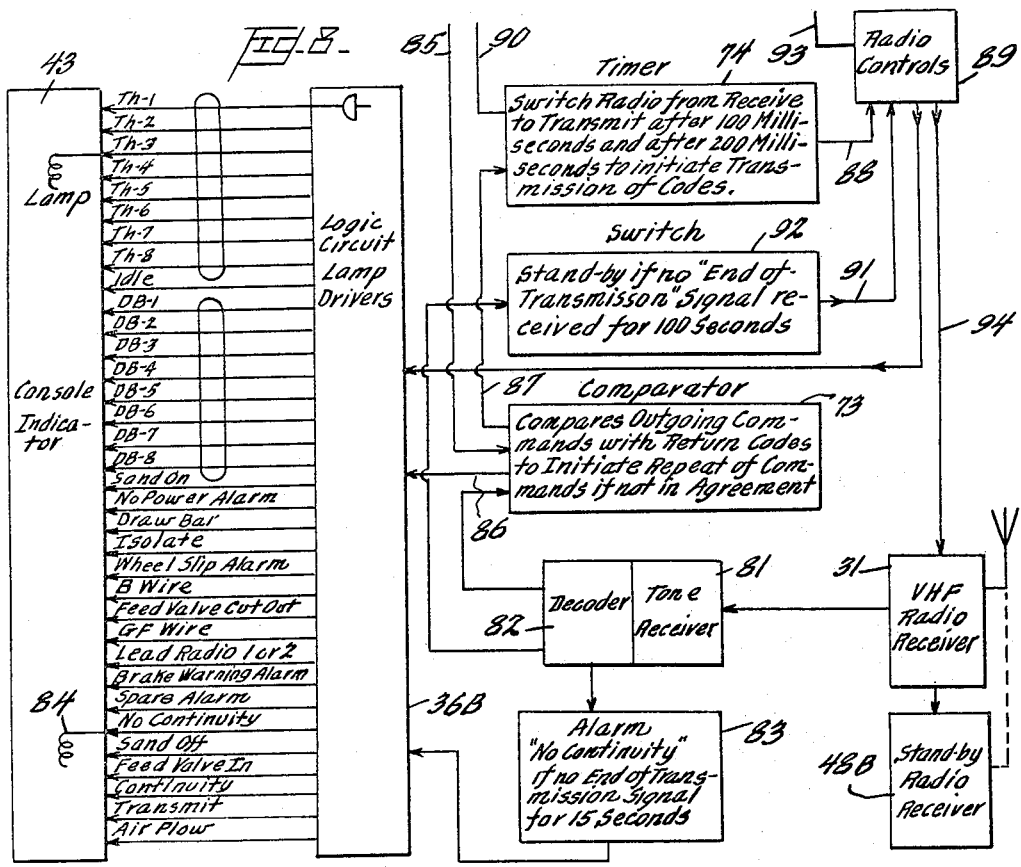
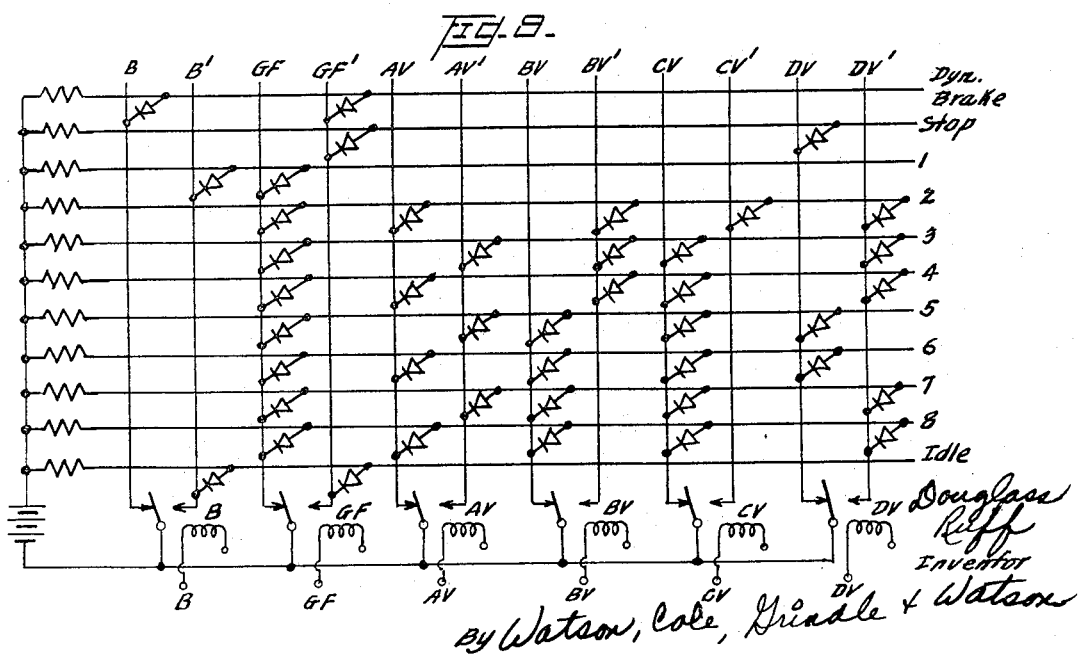
Douglass Ruff
Inventor
By Watson, Cole, Grindle & Watson
ATTORNEY

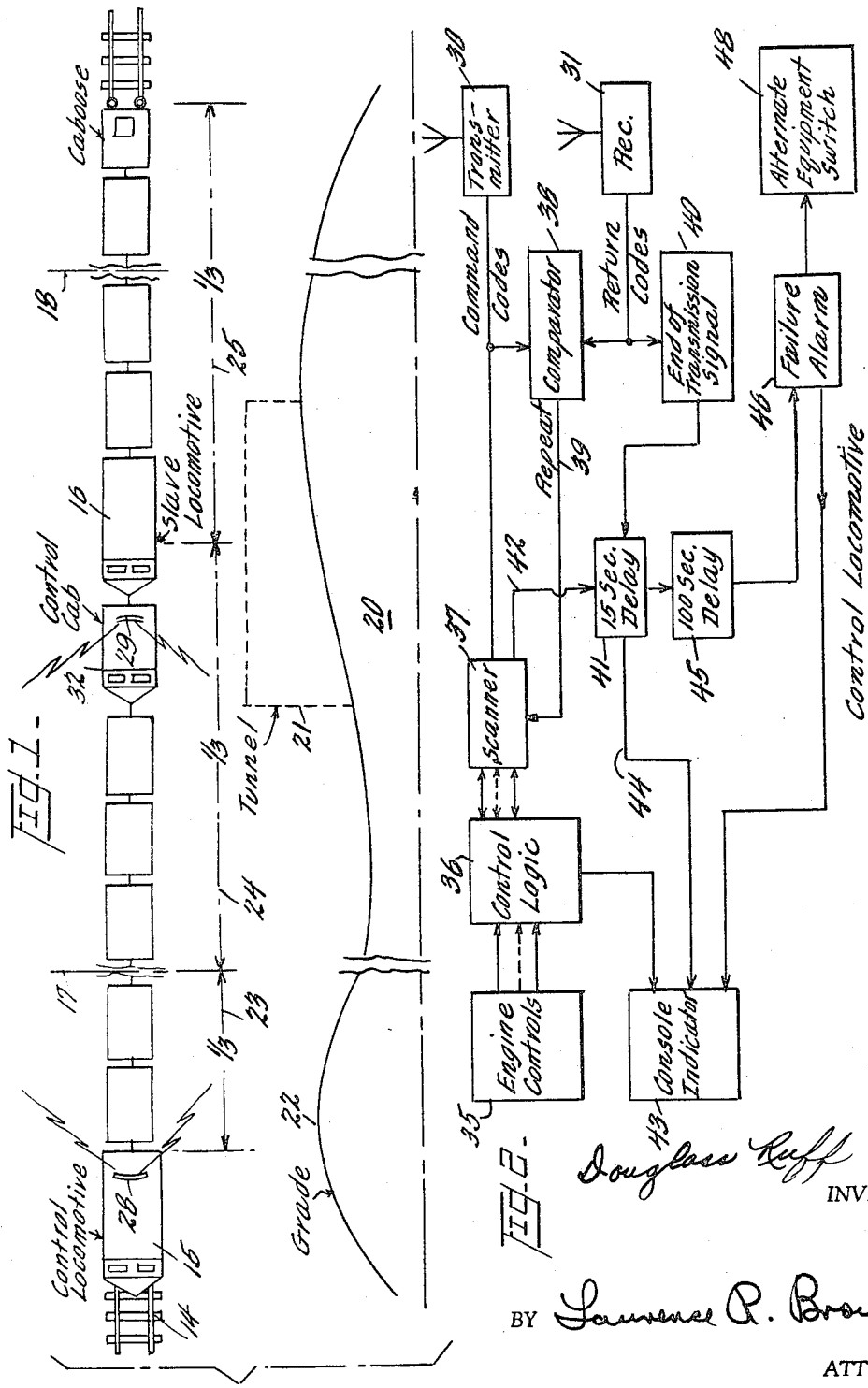

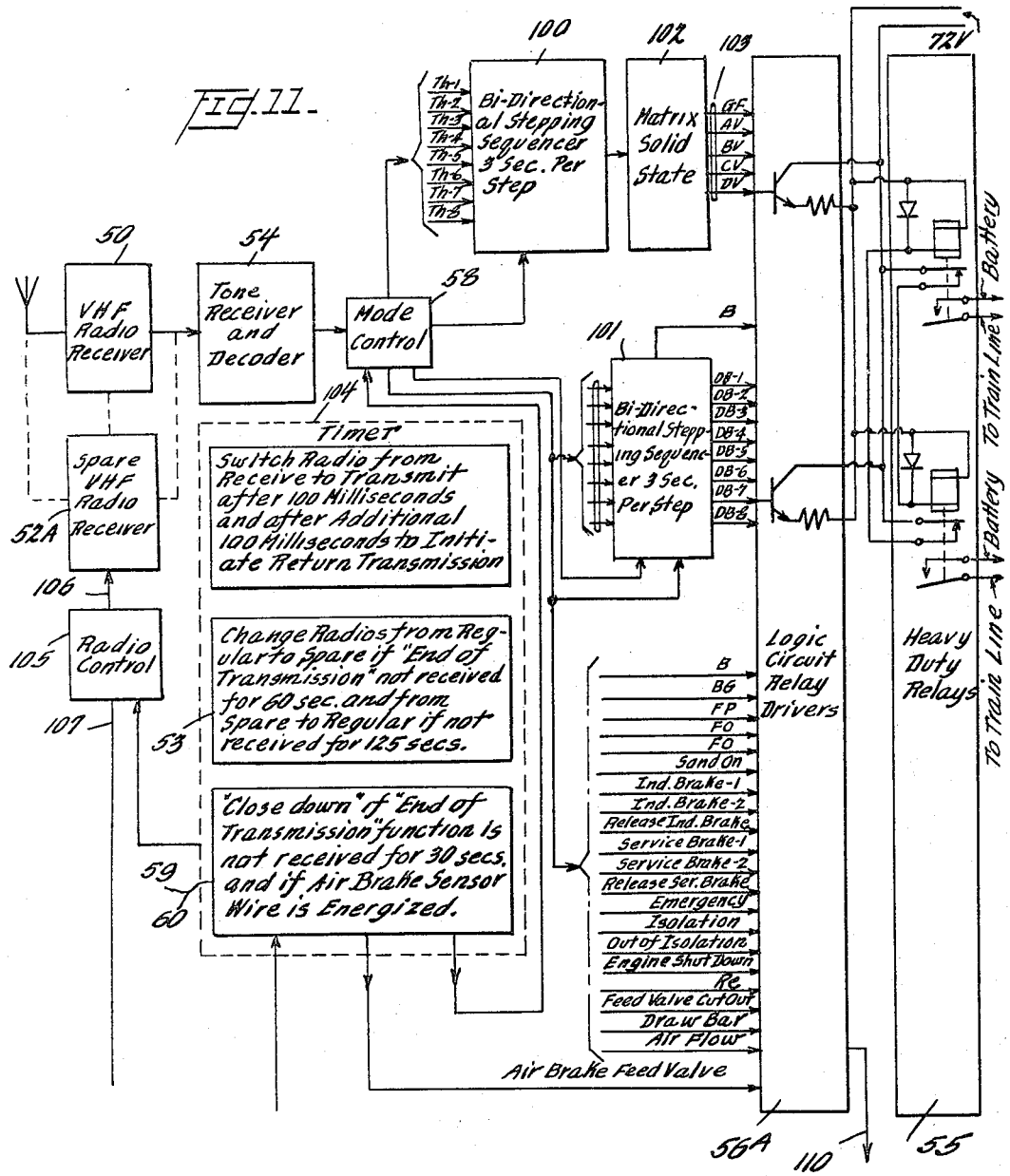

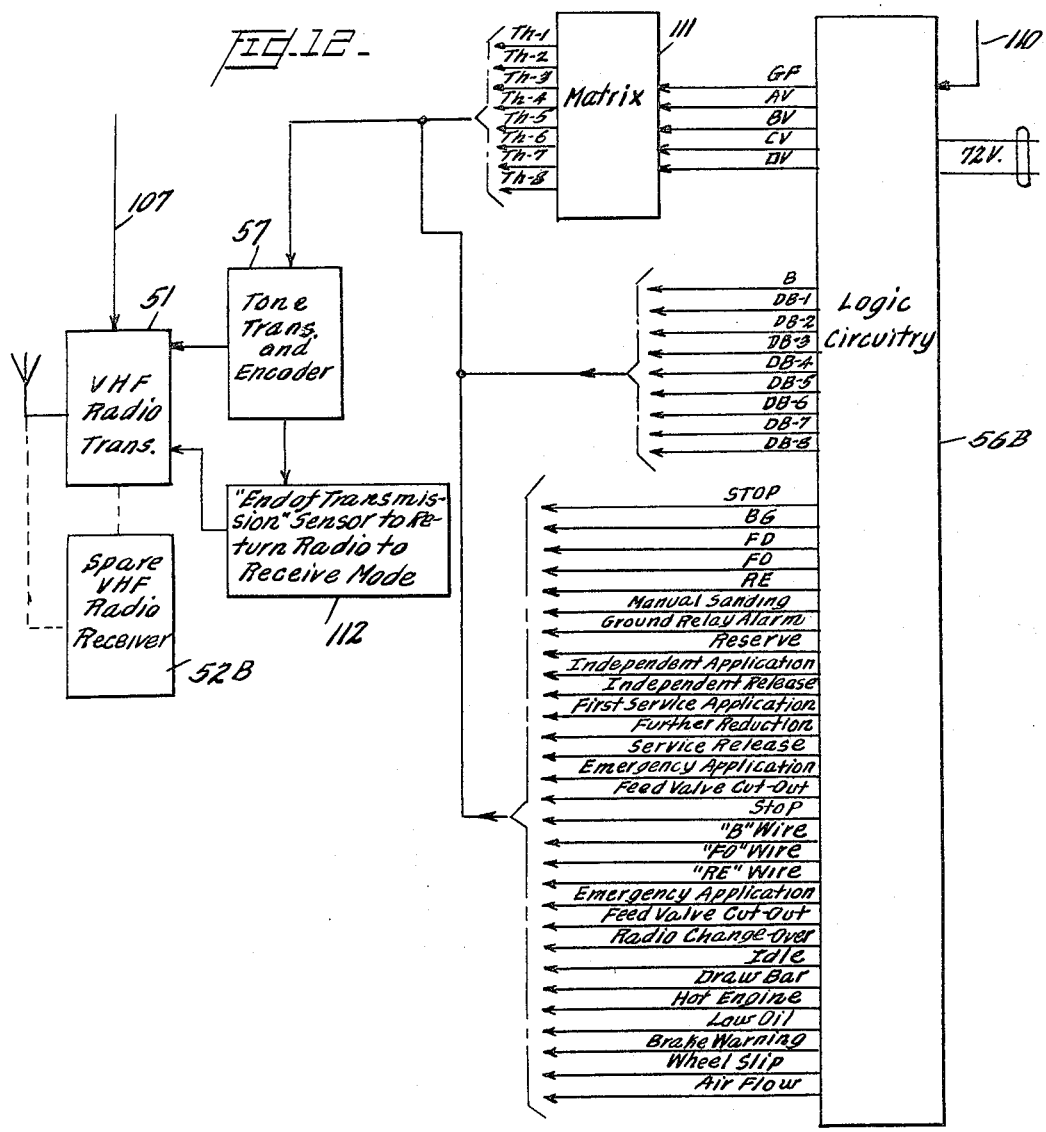

May 21, 1968   D. RUFF   3,384,033
SEMI-AUTOMATIC LOCOMOTIVE CONTROL SYSTEM
Filed May 25, 1967   7 Sheets-Sheet 7
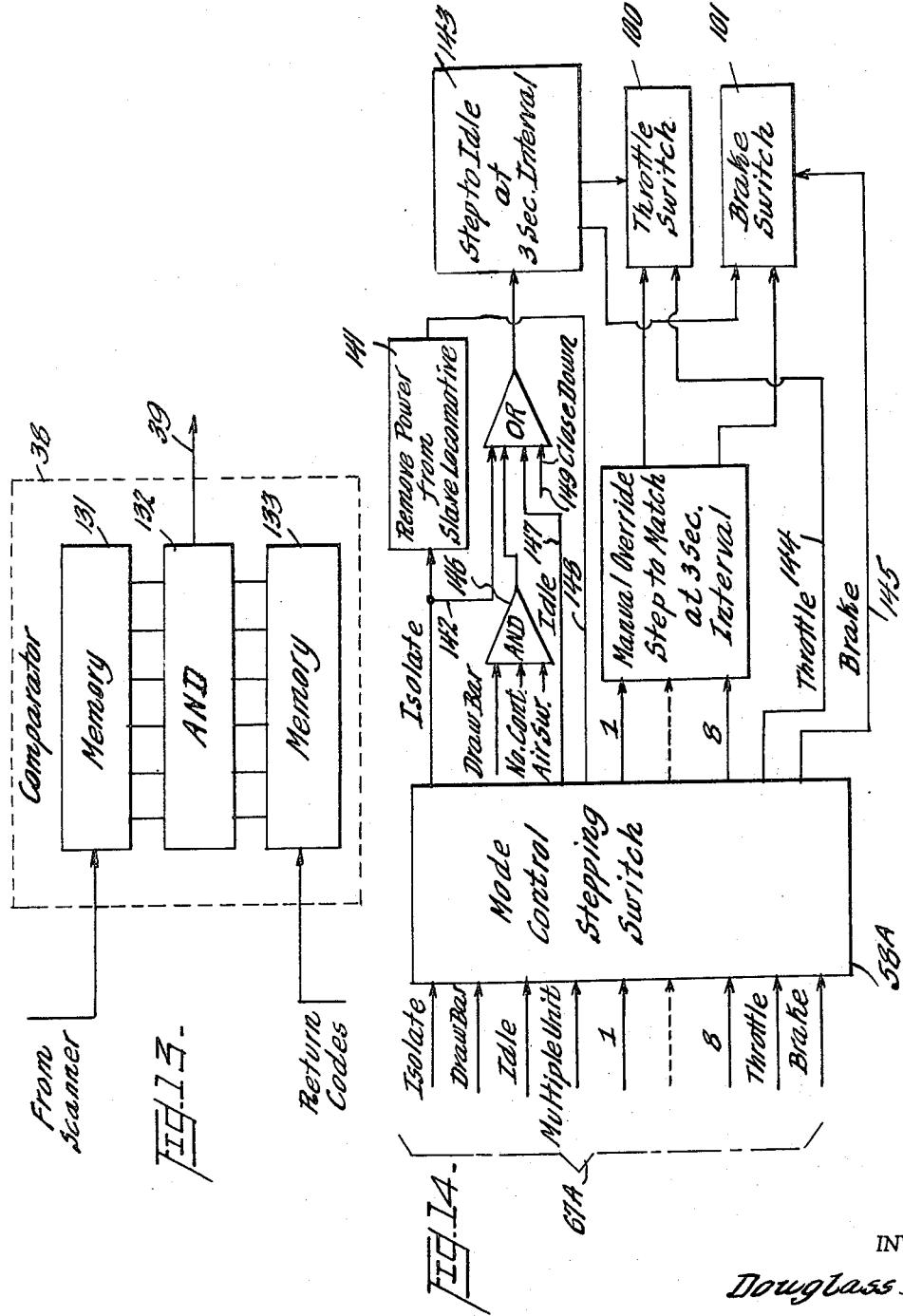
INVENTOR
Douglass Ruff,
BY Laurence R. Brown
ATTORNEY United States Patent Office 3,384,033
Patented May 21, 1968

3,384,033
SEMI-AUTOMATIC LOCOMOTIVE
CONTROL SYSTEM
Douglass Ruff, 2716 Blaine Drive,
Chevy Chase, Md. 20015
Continuation-in-part of application Ser. No. 393,440,
Aug. 31, 1964. This application May 25, 1967, Ser.
No. 641,301
13 Claims. (Cl. 105—61)

ABSTRACT OF THE DISCLOSURE

An automatic radio-controlled transmission link sets controls on a helper locomotive located amid-train in several operational modes to conform to either match the manually operated lead locomotive controls, or to produce different controls dependent upon encountered conditions such as the slack between cars sensed by draw bar mechanisms. All controls operable for this system can be located in a special cab permitting use of a standard locomotive. Protection against interruption to signals by tunnels, etc., is afforded by periodic repeating and affirmation of signal trains at closely spaced intervals of less than one minute. Reliability of the system is assured by dual equipments with automatic changeover in the event of unsatisfactory service of one. In addition, a self-identification signal prevents receiving extraneous signals from a train passing upon a nearby track. Not only air braking, but also dynamic braking and throttle conditions are set in the helper locomotive together with auxiliary functions such as sanding. The system will automatically close down when improperly operating.

---

This application is a continuation-in-part of the copending application of the same title filed Aug. 31, 1964, Ser. No. 393,440.

This invention relates to methods and apparatus for electronic control of locomotives in a train and, more particularly, it relates to the provision of a fail-safe communication system between a manned lead locomotive and an unmanned amid-train helper locomotive to effectuate control of the train under various conditions of operation.

One or more helper locomotives positioned one-third of the distance from the rear of the train has been used to assist the lead locomotive(s) and has afforded greater speeds when pulling trains over grades and has improved performance of the air brakes. However, attempts to control remotely an unmanned locomotive located amid-train have led to a significant number of problems. If dynamic braking and throttle controls are identically set on lead and helper locomotives or otherwise are not properly positioned to prevent slack between cars, a whiplash effect is frequently encountered which breaks the train couplers, particularly at the crest of hills. While proper control of the train at times requires different throttle and dynamic braking settings on the lead and amid-train locomotives, air brake settings on the lead (control) locomotive and the amid-train locomotive should be identical.

Other conditions of mismatch of throttle and dynamic braking controls can occur which lead to unsatisfactory performance. An unmanned system that is radio-controlled, for example, may temporarily lose control when one of the locomotives passes through a tunnel, or a communication link may fail from other causes so that signals between the two locomotives do not set up the necessary conditions. This might result in a malfunction on the amid-train locomotive, which could, for example, pull the train in two or cause the train to stall.

An essential feature of any train control system is control of the air brakes. The air brakes are operated by pneumatic pressure pumped through the train from the engine to provide the proper level of pressure such as 75 pounds per square inch in local tanks mounted on each car. In long trains the tank pump-up time becomes significant, and upon application of the brakes a finite time delay is encountered after the braking control is initiated which, because of long pneumatic lines and air leakage, results in uneven application of the air brakes.

While uneven application is undesirable, uneven release resulting from time delay can be disastrous. When brake release is initiated on a long train, the brakes on the head cars release before those on the rear, and often this results in a broken coupling. Improvements in effectiveness of braking and a decrease of braking time are desirable qualities in a locomotive control system.

Therefore, it is an object of the invention to provide an improved control system for an unmanned amid-train locomotive.

Another object of the invention is to provide fail-safe control of an automated locomotive over various conditions encountered in use.

Yet another object of the invention is to provide improved braking (air and dynamic) control of a train including an unmanned amid-train locomotive.

A further object of the invention is to provide fail-safe radio or inductive or other controls between a lead locomotive and an amid-train unmanned locomotive.

These and other objects and features of the invention are embodied in a communication and control link between a manned lead control locomotive and an unmanned amid-train helper slave locomotive wherein braking and throttle settings in the helper locomotive are controlled by settings which may be manual or automatic, on the lead locomotive. The control system comprises a two-way radio or other control link which provides continuous periodic two-way communication between the two locomotives to verify the control positions in effect at the helper locomotive and to indicate the results to the engineer in the lead locomotive control cab.

In accordance with one aspect of the invention, a single helper locomotive is located one-third of the way from the rear of the train to improve the braking function and to thereby effectuate faster braking control through the communication link. The radio control system is supplemented by both pneumatic control signals and indications of the relative loads borne by the respective locomotives, which operate in conjunction with and in the absence of radio control signals to provide several modes of controlled operation which may be established to meet various conditions encountered in train operation. All controls are thereby contained within the train and associated communuication link between the lead and helper locomotives.

Interlock, release and override controls are built in to phase controls automatically between different operating modes. This permits full or partial control by the lead locomotive and serves to adjust the system for optimum performance in the event of loss of communication or other failure conditions.

A system embodiment of the invention illustrating the various principles afforded therein is described with reference to the accompanying drawings, wherein:

FIGURE 1 is a diagrammatic view of a train as used in accordance with the invention with an accompanying grade chart used to illustrate some of the operating conditions encountered in service;

FIGURE 2 is a simplified block diagram of control means associated with that part of the system afforded by the invention in the control locomotive;

FIGURE 3 is a simplified block diagram of complementary control means associated with the same locomotive;

FIGURE 4 is a diagrammatic sketch of a coupling slack sensing device used in accordance with the invention;

FIGURE 5 is a diagrammatic sketch of a pneumatic sensing means employed in accordance with the principles of the invention;

FIGURE 6 is a diagram of a control panel operable by the engineer in the lead locomotive to control the train;

FIGURES 7 and 8 combine into a logic block diagram illustrating more detailed operation of the various control functions incorporated in the control locomotive;

FIGURES 9 and 10 are detailed logic diagrams illustrating operation of the throttle and braking controls;

FIGURES 11 and 12 combine into a logic block diagram illustrating more detailed operation of the various control functions incorporated in the slave locomotive;

FIGURE 13 is a block diagram of a comparator device used in accordance with the invention; and FIGURE 14 is a block diagram of mode control means incorporated in the invention.

Referring now to FIGURE 1, the representative train displayed along tracks 14 has a lead control locomotive 15, which is manned, and an amid-train unmanned helper or slave locomotive 16. The train may contain typically 200 cars and the sketch is broken at line 17, 18 to allow for variable train length and to avoid unnecessary detail in the drawing.

The accompanying graph 20 illustrates a corresponding grade profile along the track 14 of a long train, somewhat exaggerated to point out some of the conditions encountered by a train in service. A tunnel 21 is diagrammatically shown at one point and the crest of a hill 22 at another point along the grade.

In accordance with one feature of the invention, the length of the train is divided up into thirds 23, 24, 25 and the helper locomotive 16 is located two-thirds of the way back in the train. This feature is important in the braking functions of the train. Consider, for example, the matter of pumping up the local pressure tanks in a train of 200 cars from the lead locomotive 15. Because of losses at couplings, the unequal pressures at various local tanks and the length of the train it will take approximately 52 minutes to pump. A significant improvement in pump up time can result from positioning a helper locomotive in the center-rear of the train.

For example, the improvement factor in time for pump-up appears to be a factor $N=f(x)^3$, where $x$ is a term indicating the number of equal segments of the length of the train. Referring to FIGURE 1, a train with slave locomotive(s) at one location in the train would have three segments, for instance, segments 23, 24, and 25. While it is essential that the length of the segments measured in feet be approximately equal, the lengths do not seem to be critical.

By positioning the single helper locomotive 16 two-thirds of the way to the rear of the train, the pumping distance in the brake lines is reduced to one-third, and $N=(3)^3=27$. Thus, using a 200 car train as an example, pump-up time becomes 52/27 minutes, or approximately two minutes. This reaction may be considered simply by recognizing that with the chosen locomotive positions, the lead locomotive 15 need only supply pressure to pump-up the front third of the train or approximately 66 cars. The helper locomotive also needs pump the length of the same 66 cars to the rear and toward the front, so that the effective braking length of the train is 66 cars rather than 200 cars for the full train if the helper is at the head end or 100 cars if the helper locomotive were located in the center of the train. In the same manner, the time it takes to effectively brake the train is improved whenever the pneumatic brakes are operated, so that control of the helper locomotive 16 to apply the brakes concurrently with the control locomotive affords improved safety provided the helper locomotive 16 is properly positioned. Even greater improvements would be attained by use of more helper locomotives distributed through the train to provide even shorter equal control segments.

Further advantages are attained from the optimum positioning of the helper locomotive. Thus, when brakes are applied, it takes a finite time for the brakes to engage as air reduction is passed from the engine toward the rear of the train. Similarly, as the brakes are released the brakes are disengaged first at the head end of the train. Thus, in a train with only lead locomotives, it is possible to pull the train in two as the slack is taken up car by car and the strain on the draw heads becomes greater toward the front cars of a long train. The amid-train helper locomotive serves to effectively decrease the length of the train releasing the brakes faster to thus reduce the maximum strain encountered, so that it is no longer required to completely stop the train after brakes are applied to prevent broken couplings.

Also, in pulling a long train about a curve, the flange resistance becomes a significant factor, and optimum positioning of a helper locomotive permits an increase in tonnage haulable by reducing the flange resistance. Furthermore, better speed control is afforded over hills with less likelihood of pulling the train in two at the crest of a hill, since the two engines may run at different throttle or brake control settings to avoid the creation of whiplash or increased drawbar pull as the lead engine passes the crest of the hill and tends to increase speed on the downward grade. If most of a long train is past the crest 22 of a hill, the tendency to increase speed on the downgrade will cause greater drawbar strain in the lead cars because of the load of the remaining cars being pulled up to the crest of the hill, and the helper locomotive may be used to even out the drawbar load most efficiently at the shown location, which effectively makes the train one-third the overall length.

When radio controls are set up between the two locomotives 15 and 16 for controlling the unmanned or slave helper locomotive 16, as evidenced by radio antennas 28, 29 on the respective locomotives, radio control may be lost when one or the other locomotives enters the tunnel 21. Thus, the radio control system must include safeguards and interlocks against loss of communication. Also, the controls should provide for the possibility of different throttle or brake settings at each locomotive and possible failure of the radio link. Under all these conditions, the engineer in the manned lead locomotive 15 must be aware of the condition of the slave locomotive since he must control the train in a different manner when the helper is not in use. Therefore, in the hereinafter described system an indicator panel is provided in the control cab of the lead locomotive 15 for continuously signalling the condition of the slave locomotive controls to the engineer in the lead locomotive.

A block diagram of the control system is broken down in FIGURES 2 and 3 to show the equipment located respectively in the control locomotive and the slave locomotive.

The control locomotive has both a radio transmitter 30 and a receiver 31 to afford two-way communication with the corresponding receiver 50 and the transmitter 51 in the slave locomotive. The respective locomotives therefore are outfitted with the special control equipment shown in the block diagrams to permit proper control between the two locomotives via the radio communication link. However, since this equipment is not standard for all locomotives, the radio control equipment for the slave locomotive is preferably, but not necessarily, located in a relatively inexpensive but universal control cab 32 (FIGURE 1) which can be coupled to the slave locomotive 16 by conventional electric cables to effectuate control in accordance with this invention. When a control cab is used, any diesel locomotive can be used as a slave; no modifications are required. This arrangement simplifies diesel maintenance and locomotive scheduling and assignments. The control cab 32 can be continuously used and is infrequently serviced, so that efficiency of operational equipment is greatly enhanced by this expedient, which requires relatively few control cabs as compared with a corresponding required number of special slave locomotives.

Now considering the lead locomotive equipment of FIGURE 2, the transmitter 30 periodically sends out a group of coded signals derived from engine controls such as brake and throttle settings typified by block 35. Standard microwave keyed radio equipment can be purchased for this purpose such as the line of FS transmitters and receivers supplied by Radio Frequency, Lab., Inc., at Boonton, N.J. These brake and throttle settings are coded in the control logic section 36 and are scanned periodically by scanner 37 to provide command codes for transmission at transmitter 30. This is the same sort of operation done in standard radio telegraph transmission of data. However, the sequence of scanned command codes for each transmission are stored in comparator 38 for matching with return codes received by receiver 31. Thus, the slave locomotive settings are checked for operation with the original commands after the command codes received at the slave locomotive are repeated by a return transmission from transmitter 51 (FIGURE 3) of the return codes. If the return codes do not match, a repeat transmission cycle is initiated through scanner 37 by lead 39 to re-establish the control cycle.

The comparison operation may be accomplished from readily available standard equipment as shown in FIGURE 13, for example. If scanning and transmission are slow enough, a punch tape unit could be used as a memory device 131 into which each scanned code is read in sequence for storage. Faster operations could use another form of electronic register or delay line. Such storage devices are described in the book entitled "Digital Computing Systems" by S. B. Williams, McGraw-Hill, 1959, pp. 88 ff. Thus, the codes stored in memory 131 can be matched as a block with return codes put into a similar memory 133, or compared one at a time by recycling the memory 131 in unison with receipt of the return codes. The "and" circuit 132 is a standard circuit which gives an alarm signal at lead 39 when two of the compared codes do not match, and may take the form in FIGURE VI–14 or VI–16 of the referenced book. It is clear that many variations of details may be made in this comparison technique depending upon the codes used and the environmental equipment, which may be basically relay oriented, transistorized, etc., while not departing from known and conventional practices.

The scanner 37 may simply be a stepping switch such as described in circular No. 1927 entitled "basic circuits" by Automatic Electric Co. of Northlake, Ill. (1959) which shows self-stepping scanning circuits which may sense conditions at a plurality of stations such as throttle and brake settings. This is the same sort of equipment commonly used in telephone systems to scan telephone numbers. Each engine control is identified by a code designation in control logic section 36. For example, each control could simply be sequentially numbered as they were scanned and converted to binary form for transmission in the manner shown by FIGURE VI–23 of the referenced book, or in one of the other many well known ways seen in Chapter 15 entitled "Data-Conversion Equipment" in the book, High-Speed Computing Devices published by McGraw-Hill Book Co., Inc. (1950).

To assure that the communication link has not failed in any way, an end-of-transmission code is transmitted from the slave locomotive transmitter 51, and is decoded in the control locomotive unit 40. If this is not received within 15 seconds as timed from timer 41 initiated by scanner lead 42 at the end of transmission from the control locomotive, an alarm lamp for "no continuity" is lighted in the control console indicator panel 43 by way of lead 44. This can happen for example if one of the locomotives is passing through a tunnel, and the engineer in the lead locomotive thus is made aware that the slave locomotive may not be in proper control.

Should the repeat commands 39 be made and the lack of an end-of-transmission signal persist for 100 seconds as timed by unit 45, an equipment failure alarm 46 is actuated to switch in a complete set of alternate standby equipment 48 automatically.

Similarly, the slave locomotive equipment of FIGURE 3 has standby equipment 52 actuated through the 60 second delay timer 53 if the end-of-transmission signal from decoder 54 is not received properly from the control locomotive.

The slave locomotive throttle and brake controls are actuated by relays in control section 55 as instructed by the control logic circuitry 56. Return codes are transmitted back to the control locomotive through section 57 as instructed by the control logic circuitry 56.

In the slave locomotive several modes of operation are afforded as indicated by mode selector 58. One mode of operation is the passive or no-control condition, and this may be automatically entered by a step-by-step closedown procedure afforded in section 59 whenever a thirty second delay in timer 60 is encountered after the end-of-transmission signal. This returns full control of the train to the engineer at the lead control locomotive, which is signaled on his console indicator by the aforedescribed end-of-transmission alarm signal.

The mode selector also may control operation of the slave locomotive responsive to radio control signals or responsive to the functioning of pressure in the air brake line as affected by the detectors of FIGURES 4 and 5.

Slack at the slave locomotive is detectable by means of a draw-bar control switch 60 which indicates whether the slave locomotive is pushing or being pulled by respective contact with one or the other of leads 61. These leads 61 may be used respectively to step the throttle control forward or backward one position in order to cause the switch 60 to remain in midposition where the slave locomotive is neither pushing the car in front, nor being pulled by it. This is the draw-bar mode of control which may be established optionally by the engineer or automatically when radio continuity is lost.

A complementary control is the pneumatic or air line control of FIGURE 5. The cars of the train between the lead control locomotive 15 and slave locomotive 16 are coupled by the air brake line 62. If the brake setting on the slave locomotive is improperly controlled and does not follow as the brakes in the control locomotive are applied by reducing pressure in the line 62, the slave will attempt to pump up line 62. This will establish a flow of air toward the control locomotive 15 sensed in air flow detector 63 at the slave locomotive 16. The signal is used to inactivate all controls in the slave locomotive 16 and pass complete control to the lead locomotive 15.

Operational control of the train by the engineer in the lead locomotive is typified by the control panel shown in FIGURE 6. The brake control 65 and throttle control 66 represent conventional diesel locomotive controls, which are mechanically interlocked so that the throttle must be off before the brakes are applied and vice-versa. Each control has eight positions. The radio control has a rotary switch 67 which encompasses twelve control positions, each having two levels 68, 69 of indicator lamps.

The rotary switch 67 thus determines the mode of operation. In isolate position full control is afforded at the lead locomotive. Draw-bar control is effected in the next position. The idle control position provides for fixed controls in the slave locomotive. Full radio control in "multiple unit" provides for the slave locomotive to follow all control settings in the control locomotive. Manual override of a throttle or braking condition can be effected by moving to one of the positions 1 through 8, since the brake and the throttle may not be used together.

In the typical position shown the radio control 67 being in multiple unit and the brake 65 at setting 2, lamp 70 in the upper row of lamps 69 indicates the reply code from the slave locomotive with brakes on in setting 2. Similarly, the lower row of lamps 68 would indicate throttle setting.

These controls are effectuated through lead locomotive control equipment shown in block diagram form in FIGURES 7 and 8 which interconnect to form the complete control unit. Since controls on various locomotives differ slightly, and many different kinds of switching and logic circuits may be employed to attain the results, this diagram will enable those skilled in the art to employ the principles of the invention in constructing adequate control hardware.

It is noted, however, that the mode selector 58 may simply be a stepping switch as described in the above referenced circular which responds to a set of control codes to home into the desired positions transmitted by the control locomotive from engine controls as shown in FIGURE 6. The control logic circuit 56 merely takes decoded signals from coder 54 and if necessary, amplifies them and directs them in proper isolated form to the proper control relays 55 for attaining specified functions, or to mode selector 58 or return code section 57. The coder may be any sort of standard encoding device for keying the transmitter 51 in the manner of sending radio telegraph signals.

To better follow the control system, a brief description of standard diesel locomotive throttle and dynamic brake operation is in order.

In general, diesel locomotives are controlled by signals on 26-wire train line control cable. All 26 wires are not used. These cables plug-in locomotive to locomotive, and practically any number of locomotives may be controlled in tandem from the lead locomotive.

The signals on the control wires consist of the presence of absence of the 72-volt locomotive battery voltage. To operate a locomotive remote from the lead locomotive, it is necessary to replace the control cable with coding equipment, logic circuits and a radio-link. There are some functions, such as air brake control, that are not normally associated with the control cable; however, in slave locomotive operation these functions must be transmitted by radio to maintain control of the train including the air brake system.

A diesel locomotive has eight throttle positions which control the power by means of five train line wires (GF etc. in FIGURE 7) which are associated with five relays in various combinations. Rather than transmit these five combinations, it is also possible to transmit the eight throttle positions because the eight throttle positions must be displayed on the console.

The dynamic brake system, theoretically, has infinite control by varying the voltage on the train line wire in analog fashion from 0 to 72 volts. This control may be broken down in digitalized percentage steps and transmitted as a function per step; for example, 10-20-40-50-60-80-90- and 100 percent steps will be eight functions. It will be necessary to display the "report-back" transmission of the eight throttle positions together with the "brake," "stop," and "idle" positions on the console in the control locomotive. The eight dynamic brake positions plus the "off" position may also be displayed.

Combinations of the five throttling valve combinations may be converted into eight throttle positions by means of a matrix as shown in FIGURE 9. Interlocking of B with GF at the dynamic brake line and the stop line with GF is shown in the matrix. The following lists of throttle positions shows the combinations of the throttling relays:

Throttle positions, No.:      Operate relays
1 _____ GF.
2 _____ GF, AV.
3 _____ GF, CV.
4 _____ GF, AV, CV.
5 _____ GF, BV, CV, DV.
6 _____ GF, AV, BV, CV, DV.
7 _____ GF, BV, CV.
8 _____ GF, AV, BV, CV.

The following is a list of dynamic brake relays (as identified in FIGURE 1):

Dynamic braking, percent
DBC-1 _____ 10
DBC-2 _____ 20
DBC-3 _____ 40
DBC-4 _____ 50
DBC-5 _____ 60
DBC-6 _____ 80
DBC-7 _____ 90
DBC-8 _____ 100

The diagram of FIGURE 10 shows an alternative configuration whereby coded combinations can be derived from throttle and dynamic brake controls to reduce the complexity of control equipment.

The following feature is employed only when drawbar control is being used:

The circuits controlling the throttle positions and the dynamic brake positions are arranged to delay any change in status of any of these functions. Regardless of how fast the throttle lever or dynamic brake lever are moved, the slave unit must change throttle positions or dynamic position one step at a time, up or down, in proper sequence. The time required for each step is typically 2.75 seconds plus or minus 0.25 second. In other words, if the throttle on the control were suddenly moved from position #8 to position #1, the slave would step from 8 to 7 to 6 to 5 to 4 to 3 to 2 to 1, consuming about 19 seconds in this process. This part of the mode selection operation is shown in FIGURE 11 coupling mode control switch 58 to the stepping switch 100 or 101 as the case may be.

If a "no-continuity" condition exists as defined hereinbefore and if at the same time air reduction is made, the throttle and the dynamic brake controls on the slave should step to the "idle" position, as seen from circuits 59, 60 in FIGURE 11, which instruct mode control circuit switch 58 to move to "idle."

Conversely, when continuity is restored, the control locomotive should resume control of the slave, and the throttle relays on the slave should step-up one position at a time until the slave agrees with the control, so that circuits 59, 60 also cause the mode control switch 58 to revert to multiple unit when the end of transmission signal reappears in time.

Thus, the controlling end of the system shown in FIGURES 7 and 8 accepts command signals from the diesel train line provided at block 35 and converts these signals to suitable digital code for transmission by radio transmitter 30 in a conventional encoder 72 which preferably supplies tones at 75 for transmission.

The controlled end at the slave locomotive as shown in FIGURES 11 and 12 receives this code and converts to signals in a conventional decoder section 54 which under direction of the mode control switch 58 closes designated relays driven by logic section drivers 56A. These relays provide a code matching the signals sent unless an error is committed, and thus may serve simply by means of a further contact to signal back to the controlling locomotive the comparison signals as shown at 56B in FIGURE 12. The relays serve as a memory logic remaining in operation until the function is negated by further control signals.

An address code is used preceding each transmission to identify the particular train, so that controls are not intermixed in passing trains, etc. For example, one of eight address codes may be selected at each locomotive by a selector switch for example, as signified by switch 71 in encoder circuit 72 of FIGURE 7.

Each transmission will incorporate an "end-of-transmission" signal. When received by the slave unit, this will initiate the "report-back" signals to the control unit and will initiate switch over of the radio as indicated by 53 in FIGURE 11 working through radio control section 105. In the control unit of FIGURE 8 the end-of-transmission signal will initiate switch over of the radio by means of circuit sections 89, 91, and 92.

When "end-of-transmission" function is received on the slave, switch over of the radio from "receive" to "transmit" will be initiated immediately but the "report-back" code will be delayed 100 milliseconds by section 53A of FIGURE 11 to allow time for the radio, including radio repeaters, to switch over.

Measured from receipt of "end-of-transmission" function on the control unit, all transmissions from the control to the slave will be delayed 100 milliseconds to allow time for the radio including radio repeater, to switch over as seen by block 74 of FIGURE 8.

At the end of a transmission, the radio which has been transmitting will switch to the "receive" condition in less than 100 milliseconds.

For the purpose of this specification, a "transmission" is defined as transmission of all control or report back codes in a sequence.

The term "switch" or "switch over" as applied to the radio means that a simplex radio transmitting in only one direction at a time is switched from the "receive" to the "transmit" condition or vice versa. The term "change-over" means that an entire spare radio unit is substituted for the regular radio unit.

The "report-back" feature will consist of transmission (by the slave to the control unit) of codes to verify that all of the command functions have been performed and, in addition, several codes to indicate the status of certain conditions on the slave which are not involved in the command codes.

Since radio operation will be simple, special circuits may be provided to prevent both terminals from trying to transmit simultaneously.

Typically, a complete transmission of all functions including delays and report back will require about 0.67 second. This short transmission time together with the address code previously mentioned permits use by several trains of a single radio channel. This kind of operation can be called "fast transmission rate with random access."

The comparison feature in the controlling locomotive equipment to permit comparison of the input conditions with the status of the controls on the slave as indicated by the "report back" codes is indicated at block 73 in FIGURE 8 and may be of the type previously discussed in connection with FIGURE 13. The comparison circuitry should be capable of initiating command transmissions at timer block 74 and lighting a lamp through logic circuit 36B in console indicator 43. Certain other ones of the "report back" codes will light display lamps on a control console. These lamps will be in addition to the continuity signal lamp.

Command functions from the control to the slave will be initiated:

(a) When there is a change in status of any control function on the controlling locomotives.

(b) When the comparison feature is not satisfied.

(c) A minimum of once per minute. Circuitry will be included to insure automatic transmissions from the control to the slave at intervals of not less than one minute.

(d) Each control function should be transmitted on each transmission.

"Report back" transmission will be initiated:

(a) Immediately after a control transmission has been received.

(b) When there is a change in status of any reportable condition on the slave.

(c) Each "report back" code should be transmitted on each transmission.

There will be a "continuity" lamp and a "no-continuity" lamp on the console on the control locomotive. The "continuity" lamp will be lighted as long as "report back" transmissions are received at intervals of one minute or less. If a "report back" transmission has not been received for a period of 60 seconds, the "no-continuity" lamp must light. This operation may be seen at circuit 83 of FIGURE 8.

If the slave does not receive a command within one minute after the previous command, a relay must operate to prepare the slave for "close down." "Close down" will consist of stepping the throttle ot the "idle" position and operating a solenoid in the air system as seen from circuit 53 operating through mode control circuit 58 to stepping switch 100.

With standby radios on the control locomotive and on the slave locomotive, the change over function from regular-to-spare and from spare-to-regular will also occur as follows:

(a) The slave radio will change from regular-to-standby if no transmission has been received from the control for a period of 75 seconds.

(b) The control radio will change from regular-to-standby if no transmission has been received from the slave for a period of 100 seconds.

(c) The slave radio will change from standby-to-regular if no transmission has been received from the control for a period of 125 seconds.

Audio tones may be used to transmit digital information as shown in block 75 of FIGURE 7 and may operate on the frequency shift principle. The shift can be about 900 c.p.s. either side of a center frequency of about 1700 c.p.s.; the bandwidth being from 800 to 2600 c.p.s., approximately.

Requirements for air brake control are:

(a) The first air brake function relay on the slave must be actuated within 0.25 second after function is initiated by operation of a push button on the control unit.

(b) A second air brake function relay on the slave must remain actuated the entire time that the air brake push button is actuated on the control.

(c) Both air brake function relays on tht slave must release within 0.25 second after the air brake push button on the control is released.

The hereinbefore described principles of operation are carried out in FIGURES 7, 8, 11, and 12 in the following manner:

Control unit operation for transmission of data as shown in FIGURE 7 which are selected by the switch control described in FIGURE 6 are incorporated in the control console section 76. The selection matrix of FIGURE 9 is shown in throttle matrix section 77, and the logic circuitry section 36A/37 incorporates the scanning circuits of FIGURE 2. FIGURES 7 and 8 correspond to FIGURE 2 and use similar reference characters where applicable.

Additional control switches are incorpoarted in the console section 76 as represented by switch grouping 78 to perform miscellaneous functions such as control of sanding. Also, a section 79 has push buttons for control of the air brakes through electrical control section 80 in the control locomotive and processed in logic circuitry section 36A.

The logic circuitry section 36A serves with aid of encoder section 72 to encode all the signals at the transmitter 30 while scanning them in proper sequence for supplying a sequence of digital tones in section 75 for transmission by transmitter 30.

For example, a multiple position multiple-deck stepping switch could use one deck to program the scanning of those leads shown in FIGURE 7 upon command and after scanning once would rest in one free position as home until receiving an additional start command. Wiring of such circuits is well known and may be seen, for example, in the above referenced circular. An appropriate code could then be wired as a combination of code groupings in the remaining decks. For example, if simple binary code were used, each coding deck of the switch could represent the respective binary digits such as $2^2$ or $2^4$, etc. for identifying the code at each step for each of the lines and this code would be transmitted only if the corresponding line were energized. Thus, the logic circuit 36A/37 is simply a scanning repeater for programming a sequence of transmissions from transmitted 30 representative of the status of control wires and operational controls in the control locomotive.

Control unit operations for reception of data shown in FIGURE 8 are initiated as before described by repeat transmissions sent back from the slave unit and processed in radio receiver 31 through tone receiver section 81 and decoder 82 which operates with comparator 73 as previously described. The special "no-continuity" condition is processed through alarm circuit 83 if no end-of-transmission code is received for the built-in fifteen seconds time delay. This instructs the appropriate lamp 84 in console indicator 43 to indicate the condition via lamp drivers in logic section 36B, which could simply be relays for each of the corresponding lamps operable from the detected signals.

The set of decoded signals corresponding to instructions transmitted are introduced from decoder 82 into comparator 73, which has previously stored the transmitted signals as received from encoder 72 of FIGURE 7 on lead 85. If the signals do not compare, the encoder section 72 is instructed via lead 85 to retransmit a new set of coded signals, to thus correct for any temporary loss of communication or a transmission error. The set of signals also drives corresponding indicator lamps in console indicator 43 via lead 86, so that the entire status of slave locomotive conditions may be monitored by the engineer in the control locomotive.

A further lead 87 transmits the decoded signals to timer 74, which serves in normal fashion to switch over the radio from receive to transmit after 100 milliseconds, by lead 88 at radio control section 89 and to initiate transmission of codes after 200 milliseconds by lead 90 at encoder circuit 72 (in FIGURE 7). Thus, a simple start scan control signal can start the scanning switch 37 through its sequence.

The radio controls section 89 may be a set of relays serving to select either transmit or receive modes in the corresponding units 30 and 31 by way of leads 93 and 94 or to switch to stand-by equipment 48A or 48B if so instructed at lead 91 from switch section 92, which operates when no end-of-transmission signal is received for 100 seconds. Thus, a time delay intervenes to prevent change over when communication is temporarily interrupted by passing through a tunnel, for example.

It is seen therefore, that the control locomotive section is a simple system made up from known and conventional elements to transmit a sequence of coded signals from the control locomotive data to the slave locomotive and to check back on the validity of that data. In this and other sections of the system considerable leeway is provided for using discretion in the engineering design of the system. For example, in some cases transistors may be more reliable than relays, or electronic storage devices may be preferable to give higher speed scanning and feedback. Also, some of the illustrated control wires may not be necessary and others may be included. However, the illustrated system shows a typical workable operation preferred for certain classes of locomotives, and includes protective features which permit efficient and reliable train control without significant danger of pulling the train apart when unusual conditions are encountered.

The slave unit receiver of FIGURE 11, and the transmitter of FIGURE 12 correspond to the diagram of FIGURE 3 and use similar reference characters where applicable. Construction of the various sub-system components is similar to that of the control locomotive equipment. Thus, receiver 50 receives code groupings from the control locomotive transmitter and decodes them at section 54, to operate the mode control section 58 in the manner hereinbefore described and to pass signals therethrough to the logic circuit section 56, which is merely a signal translation circuit incorporating typical transistor switching circuits to control relays in the locomotive control section 55.

To aid in the "close down" function and the mode selection operation, bidirectional switches 100 and 101 are used. A code converting matrix 102 is used to convert the throttle controls back to the regular train control signals 103, in the manner hereinbefore set forth.

The mode control circuit 58 may be operated by equipment as set forth in FIGURE 14, using a stepping switch 58A which is connected to follow signals at the input leads 67A corresponding to received codes matching the status of the control panel of FIGURE 6.

Thus, it is seen that the "isolate" mode need only remove the power from the slave locomotive as shown by block 141, but it is also desirable to delay this until the throttle and brake controls step down to idle position as accomplished by lead 142. Thus, at section 143 a timer causes a step each three seconds until the controlled switch 100 or 101 is homed at idle position. The respective switch 100 or 101 is enabled depending upon whether the throttle or brake is in use as accomplished by leads 144, 145, so that only one switch can be in use at a time.

The "draw bar" mode is similar in operation except that the step-down only occurs when a no-continuity signal and the air sensing switch are both in operation as effected by AND circuit 146.

The "idle" mode directly steps the corresponding switches 100 or 101 down to idle position by way of lead 147.

The "multiple unit" operational mode serves to restore power to the slave locomotive at section 141 as indicated by lead 148, so that the incoming signal codes can establish corresponding control and slave locomotive conditions in the manner hereinbefore described.

Manual override, which permits control on hill crests, for example where one locomotive should operate under different throttle or brake conditions, is accomplished by positions 1 to 8 of the console control switch 67 of FIGURE 6, as hereinbefore described. This merely serves to step the actuated switch 100 or 101 to a step matching position at three second intervals.

Timer section 104 serves to operate radio control section 105 in the manner previously designated to switch from transmit to receive at leads 106 and 107, and to introduce spare equipment 52A and 52B if necessary, by operation of section 53. The "close down" operation is also initiated after a delay in unit 59, 60, as shown by lead 149 in FIGURE 14.

In order to return the received codes from the transmitter section of FIGURE 12, the lead 110 represents operation of a scanning switch which sequences the status of a set of contacts on each of the relays 55 for example and thus returns received logic signals through logic section 56B and matrix 111 to the encoder and tone transmitter 57 for radio transmission at transmitter 51. Further radio control is afforded in section 112 to return the radio to receive mode when the "end-of-transmission" signal appears at the end of the transmission of signals in encoder section 57.

Thus, the present invention has afforded improvements in train controls which produce better control over braking and resolve many ambiguities existing in prior art control equipment. Trains may be operated efficiently and reliably in accordance with the features afforded by this invention, as defined with particularity in the appended claims, which set forth the nature of this invention and define novel aspects not heretofore recognized.

What is claimed is:

1. A radio controlled system for a train comprising in combination, a manned control locomotive having means for generating control signals identifying the braking condition thereof, an unmanned slave locomotive providing braking power in the train at a location remote from the control locomotive, a communication link periodically conveying sets of control signals including said signals identifying the braking condition between said locomotives, and means for operational control of said slave locomotive from said sets of control signals comprising braking controls settable to release said braking power from the slave locomotive at a level corresponding to signals conveyed through said communication link identifying the braking condition on said control locomotive, wherein the train has an air pressure line extending between the said control and slave locomotives, means in the train for sensing air flow from the slave locomotive to the control locomotive in said line, and controls operative from said means to cut out operational control of the slave locomotive through the communication link when the air flow from the slave to the control locomotive is sensed by said means.

2. A radio controlled system for a train comprising in combination, a manned control locomotive having means for generating control signals identifying the braking condition thereof, an unmanned slave locomotive providing braking power in the train at a location remote from the control locomotive, a communication link periodically conveying sets of control signals including said signals identifying the braking condition between said locomotives, and means for operational control of said slave locomotive from said sets of control signals comprising braking controls settable to release said braking power from the slave locomotive at a level corresponding to signals conveyed through said communication link identifying the braking condition on said control locomotive, including controls operable through said communication link for setting the throttle positions on the two locomotives independently.

3. A radio controlled system for a train comprising in combination, a manned control locomotive having means for generating control signals identifying the braking condition thereof, an unmanned slave locomotive providing braking power in the train at a location remote from the control locomotive, a communication link periodically conveying sets of control signals including said signals identifying the braking condition between said locomotives, and means for operational control of said slave locomotive from said sets of control signals comprising braking controls settable to release said braking power from the slave locomotive at a level corresponding to signals conveyed through said communication link identifying the braking condition on said control locomotive, including means controlled responsive to signals conveyed in the communication link for isolating the slave locomotive by phasing out all of its control functions.

4. A radio controlled system for a train comprising in combination, a manned control locomotive having means for generating control signals identifying the braking condition thereof, an unmanned slave locomotive providing braking power in the train at a location remote from the control locomotive, a communication link periodically conveying sets of control signals including said signals identifying the braking condition between said locomotives, and means for operational control of said slave locomotive from said sets of control signals comprising braking controls settable to release said braking power from the slave locomotive at a level corresponding to signals conveyed through said communication link identifying the braking condition on said control locomotive, including means operable in a first control mode permitting train control only by the control locomotive with the slave locomotive cut out, and operable in a second mode of control providing for each locomotive to be in substantially the same braking and throttle control to thereby jointly control the train, and further including means responsive to a lack of correspondence between the braking and throttle controls in the two locomotives to automatically cause the slave locomotive to pass into the first mode.

5. A radio controlled system for a train comprising in combination, a manned control locomotive having means for generating control signals identifying the braking condition thereof, an unmanned slave locomotive providing braking power in the train at a location remote from the control locomotive, a communication link periodically conveying sets of control signals including said signals identifying the braking condition between said locomotives, and means for operational control of said slave locomotive from said sets of control signals comprising braking controls settable to release said braking power from the slave locomotive at a level corresponding to signals conveyed through said communication link identifying the braking condition on said control locomotive, wherein the slave locomotive comprises a separable control cab with radio communication link and control equipment responsive to control locomotive signals therein, and a locomotive coupled thereto having operational controls responsive to the control equipment in said control cab.

6. A radio controlled system for a train comprising in combination, a manned control locomotive having means for generating control signals identifying the braking condition thereof, an unmanned slave locomotive providing braking power in the train at a location remote from the control locomotive, a communication link periodically conveying sets of control signals including said signals identifying the braking condition between said locomotives, and means for operational control of said slave locomotive from said sets of control signals comprising braking controls settable to release said braking power from the slave locomotive at a level corresponding to signals conveyed through said communication link identifying the braking condition on said control locomotive, including means operable in a first control mode permitting train control only by the control locomotive with the slave locomotive cut out, and operable in a second mode of control providing for each locomotive to be in substantially the same braking and throttle control to thereby jointly control the train, wherein a draw bar sensor is provided to sense the pull and slack in said train and produce corresponding signals, means sensing communication between the locomotive and signaling a loss of communication, and means effecting a third mode of operation to operate controls in the slave locomotive responsive to said signals from the draw bar sensor when loss of communication in said link is signaled.

7. A system as defined in claim 6, wherein the throttle is controlled on said slave locomotive by the means effecting the third mode of operation to relieve pull sensed by said draw bar.

8. A radio controlled system for a train comprising in combination, a manned control locomotive having means for generating control signals identifying the braking condition thereof, an unmanned slave locomotive providing braking power in the train at a location remote from the control locomotive, a communication link periodically conveying sets of control signals including said signals identifying the braking condition between said locomotives, and means for operational control of said slave locomotive from said sets of control signals comprising braking controls settable to release said braking power from the slave locomotive at a level corresponding to signals conveyed through said communication link identifying the braking condition on said control locomotive, wherein the communication link is a two-way radio transmission system, operating means is provided for periodically comparing signals representing setting of controls on the two locomotives, a spare radio transmission system is provided, and automatic switch means responsive to a miscomparison sensed by the operating means engages the spare transmission link.

9. An automatic control system for an unmanned slave locomotive located amid-train from a manned lead locomotive comprising a first radio communication link establishing a set of coded signals at the slave locomotive, means to control the performance of the slave locomotive from said set of coded signals, an air line coupling the two locomotives and further control means responsive to the reverse flow of air in said line to override controls in said slave locomotive established by said radio signals.

10. An automatic radio control system for an unmanned slave locomotive constituting an electrically controlled locomotive having a plurality of electrical control leads located amid-train from a manned lead locomotive comprising a radio control system associated with the controls in the lead locomotive to send signals for controlling the slave locomotive control, means responsive to said signals located in and comprising a control cab, and means coupling the slave locomotive to said control cab by medium of said electrical control leads for control by said control means.

11. In a radio control system for operating an unmanned amid-train helper locomotive from radio signals from a manned lead locomotive, the improvement comprising means for storing radio control signals sent from the lead locomotive to control the helper locomotive means for producing signals at the helper locomotive signifying the position of the controls set responsive to said signals, comparison means to signal a mismatch between the signals and the position of the controls and means responsive to the mismatch signal to affect a retransmission of the control signals to said helper locomotive.

12. In a train having a control system for operating an unmanned amid-train helper locomotive from a manned lead locomotive, the improvement comprising, an air brake line connected between said locomotives, means sensing a flow of air in said line from the helper locomotive to the lead locomotive to produce an alarm signal, and automatic means responsive to said alarm signal to adjust controls on said helper locomotive to a position where the flow of air in said direction discontinues.

13. The combination defined in claim 12, including means sensing when the control system is operating the helper locomotive and means responsive to the sensing means to remove all controls on said helper locomotive when said alarm signal is encountered.

References Cited

UNITED STATES PATENTS

| | | |
|---|---|---|
| 1,786,815 | 12/1930 | Aspinwall. |
| 1,900,408 | 3/1933 | Sorensen _____ 246—182 |
| 2,937,907 | 5/1960 | Harris et al. _____ 246—30 X |
| 2,977,896 | 4/1961 | Hammond _____ 105—61 |
| 3,217,662 | 11/1965 | Hughson et al. _____ 105—1 |
| 3,217,663 | 11/1965 | Hughson _____ 105—1 |

FOREIGN PATENTS 1,277,755  10/1961  France.

ARTHUR L. LA POINT, *Primary Examiner.*

STANLEY T. KRAWCZEWICZ, *Examiner.*